(12) United States Patent
Akrin

(10) Patent No.: US 8,455,782 B2
(45) Date of Patent: Jun. 4, 2013

(54) PORTABLE EDM SYSTEM FOR MAKING CALIBRATION STANDARDS

(75) Inventor: Stewart Joseph Akrin, Hixson, TN (US)

(73) Assignee: ALSTOM Technology Ltd, Baden (CH)

( * ) Notice: Subject to any disclaimer, the term of this patent is extended or adjusted under 35 U.S.C. 154(b) by 535 days.

(21) Appl. No.: 12/721,674

(22) Filed: Mar. 11, 2010

(65) Prior Publication Data

US 2011/0220614 A1    Sep. 15, 2011

(51) Int. Cl.
*B23H 1/02* (2006.01)
(52) U.S. Cl.
USPC ..................................... 219/69.11; 219/69.13
(58) Field of Classification Search
None
See application file for complete search history.

(56) References Cited

U.S. PATENT DOCUMENTS

| | | | | |
|---|---|---|---|---|
| 3,933,026 A | * | 1/1976 | Ham et al. | 73/1.86 |
| 3,939,321 A | * | 2/1976 | Bertrand et al. | 219/69.14 |
| 4,948,933 A | * | 8/1990 | Thompson | 219/69.2 |
| 5,077,456 A | * | 12/1991 | St. Louis | 219/69.1 |
| 5,616,259 A | * | 4/1997 | Habel et al. | 219/69.2 |
| 5,618,449 A | * | 4/1997 | Houman et al. | 219/69.11 |
| 5,861,608 A | * | 1/1999 | Thompson | 219/69.2 |

FOREIGN PATENT DOCUMENTS

| | | | |
|---|---|---|---|
| CN | 201220305 | | 4/2009 |
| CN | 201220305 Y | * | 4/2009 |
| GB | 2306370 A | * | 5/1997 |

OTHER PUBLICATIONS

PCT International Search Report and the Written Opinion of the International Searching Authority, dated Jun. 17, 2011—(PCT/2011/024487).

* cited by examiner

*Primary Examiner* — David E Graybill
(74) *Attorney, Agent, or Firm* — James J. Cummings

(57) ABSTRACT

A portable EDM device and system thereof for producing calibration reflectors on a pipe includes a base mountable on the pipe, a motor mounted on the base, a cutting tool operably connected to the motor, an electrode operably connected to the cutting tool, a power source mounted on the base and operably connected to the electrode and operably connectable to the pipe, and a source of dielectric fluid mounted on the base. The power source is configured to electrically discharge a voltage from the electrode to the pipe to remove material from the pipe. The source of dielectric fluid is in fluid communication with the pipe to remove the material removed from the pipe.

8 Claims, 4 Drawing Sheets

PORTABLE EDM SYSTEM FOR MAKING CALIBRATION STANDARDS

TECHNICAL FIELD

The disclosure herein is a general description of a system and device for machining calibration standards into surfaces for use with non-destructive testing techniques. More particularly, the disclosure is directed to portable device capable of machining calibration standards in heavy wall pipe using an electrical discharge machining (EDM) process.

BACKGROUND

Standards are set by the American Society of Mechanical Engineers (ASME) with regard to boilers and pressure vessels to ensure the safe and effective practice of boiler and pressure vessel manufacture and operation. These standards are set forth in the ASME Boiler and Pressure Vessel Code (hereinafter "the Code"), which indicates that calibration standards shall be of the same nominal diameter and thickness and the same nominal heat treatment condition as the piping and tubing used in the manufacture of pressure vessels being examined. The Code also indicates that calibration reflectors used in the testing shall be axial notches or grooves placed on the outside and inside surfaces of the calibration standard. The lengths, widths, and depths, of such notches or grooves are explicitly set forth in the Code and carefully controlled, as are distances between the notches or grooves.

Thus, a calibration standard for a particular heavy wall pipe material to be used in the construction of a boiler comprises a suitable length and configuration of the particular heavy wall pipe. The notches or grooves are used to calibrate non-destructive testing equipment that typically employ ultrasonic techniques. Such ultrasonic techniques generally assess the qualities of welds and determine pipe wall thicknesses as well as detect corrosion. In using ultrasound, ultrasonic pulse-waves at frequencies of up to about 50 MHz are applied to the pipe material at the notches placed therein. The particular topography (e.g., square, U-shaped, V-shaped) of the notch into which the pulse-waves are applied determines an expected return waveform. The return waveform is analyzed, and any deviation from the expected return waveform is assessed with regard to defects in the tested material.

In boiler construction, the pipes used can be sizable. Once located in the supplier market place, such pipes are typically sent to a suitable facility for notching and testing. The notching may be performed using electrical discharge machining (EDM). In the process of EDM, a machine tool holds a shaped electrode which is advanced into the material to be tested to produce a shaped cavity (e.g., the notch). Power is supplied such that a high frequency series of electrical spark discharges are produced from the shaped electrode. Because the devices used in EDM are typically larger and heavier than samples of the pipes to be tested, samples of the pipes are brought to the EDM devices. Particularly when the pipes are very large (e.g., about 20 inches in diameter), the costs to transport the pipes from the market place, to the notching facility, to the testing facility, and to the site at which the pipes are to be used can be expensive.

SUMMARY

According to one aspect described herein, there is provided a system for preparing pipes for the calibration of electronic testing devices. This system comprises a workpiece comprising a pipe and a portable EDM system for producing calibration reflectors on the pipe. The portable EDM system is mountable on the pipe.

According to another aspect described herein, there is provided a portable EDM system for producing calibration reflectors on a pipe. This system comprises a cutting tool, a motor operably connected to the cutting tool, an electrode operably connected to the cutting tool, a power source operably connected to the electrode and operably connectable to the pipe, and a source of dielectric fluid in fluid communication with the pipe. The motor moves the cutting tool in a preselected pattern. The power source is configured to electrically discharge a voltage from the electrode to the pipe to remove material from the pipe. The source of dielectric fluid is in fluid communication with the pipe to remove the material removed from the pipe.

According to another aspect described herein, there is provided a portable EDM device for producing calibration reflectors on a pipe. This device comprises a base mountable on the pipe, a motor mounted on the base, a cutting tool operably connected to the motor, an electrode operably connected to the cutting tool, a power source mounted on the base and operably connected to the electrode and operably connectable to the pipe, and a source of dielectric fluid mounted on the base. The power source is configured to electrically discharge a voltage from the electrode to the pipe to remove material from the pipe. The source of dielectric fluid is in fluid communication with the pipe to remove the material removed from the pipe.

BRIEF DESCRIPTION OF THE DRAWINGS

Referring now to the Figures, which are exemplary embodiments, and wherein like elements are numbered alike.

DETAILED DESCRIPTION

Figure 1:
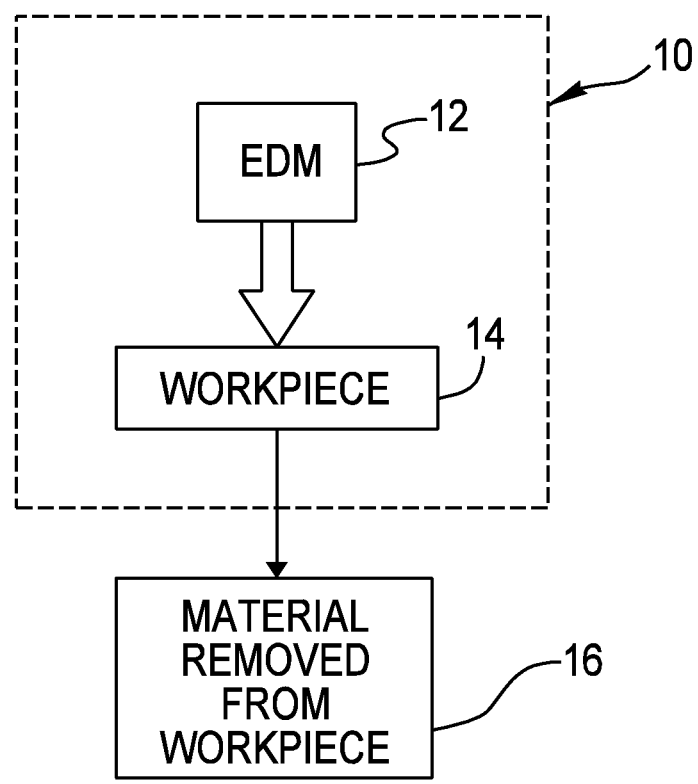
FIG. 1 is a schematic representation of a system for preparing pipes for the calibration of electronic testing devices.

Referring to FIG. 1, a system for preparing pipes for the calibration of electronic testing devices is designated generally by the reference number 10 and is hereinafter referred to as "system 10." This system comprises a portable EDM system 12 capable of producing notches on pipes to be used in the manufacture of pressure vessels such as boilers. The use of the portable EDM system 12 is not limited to producing notches, however, as any type of calibration reflector suitable for the calibration of electronic testing devices is within the scope of this disclosure. Electronic testing devices that may be calibrated using the system 10 include, but are not limited to, ultrasonic testing devices, radiographic testing devices, eddy-current testing devices, and the like.

The system 10 also includes a workpiece 14 on which the portable EDM system 12 is operable. The workpiece 14 may be a pipe, tube, or any other element used in the manufacture of boilers. The portable EDM system 12 is operable on any surface of the workpiece 14. For example, when the workpiece 14 is a length of pipe, the portable EDM system 12 can be operable on an outer surface thereof. If the inside diameter of pipe is suitably large, the portable EDM system 12 can be operable on an inner surface of the pipe.

In the operation of the portable EDM system 12 on the workpiece 14, material is removed and ejected from the system 10. The removed material, which is designated generally by the reference number 16, comprises swarf in the form of spherical particles of metal vaporized from the workpiece 14 by the portable EDM system 12.

Figure 2:
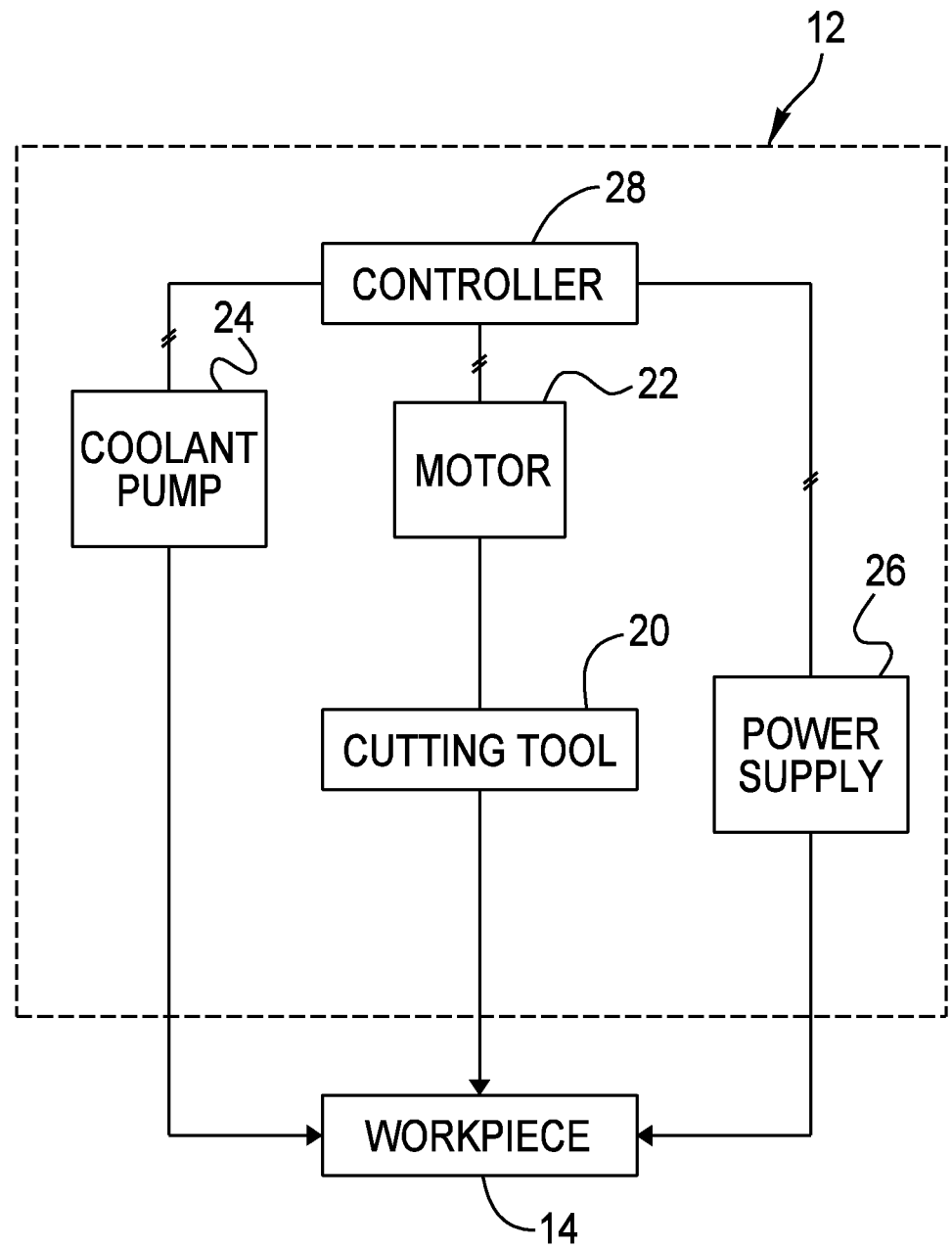
FIG. 2 is a schematic representation of a portable EDM system for use in the system of FIG. 1.

Referring now to FIG. 2, the portable EDM system 12 comprises a cutting tool 20, a motor 22 for effecting the movement of the cutting tool on the workpiece 14, a dielectric fluid pump 24, and a power source 26 for operating the cutting tool. The motor 22, the dielectric fluid pump 24, and the power source 26 are controllable via a controller 28. The controller 28 may be a computer or other type of programmable logic circuit (PLC). The cutting tool 20, the dielectric fluid pump 24, and the power source 26 are all operable on the workpiece 14. During operation of the portable EDM system 12, the cutting tool 20, the dielectric fluid pump 24, and the power source 26 cooperate in accordance with a preselected program to produce one or more notches on the workpiece 14. The computer or programmable logic circuit of the controller 28 facilitates the cutting of the notches to the pre-determined specifications set forth by the ASME Code and programmed into the computer or PLC by an operator.

Figure 3:
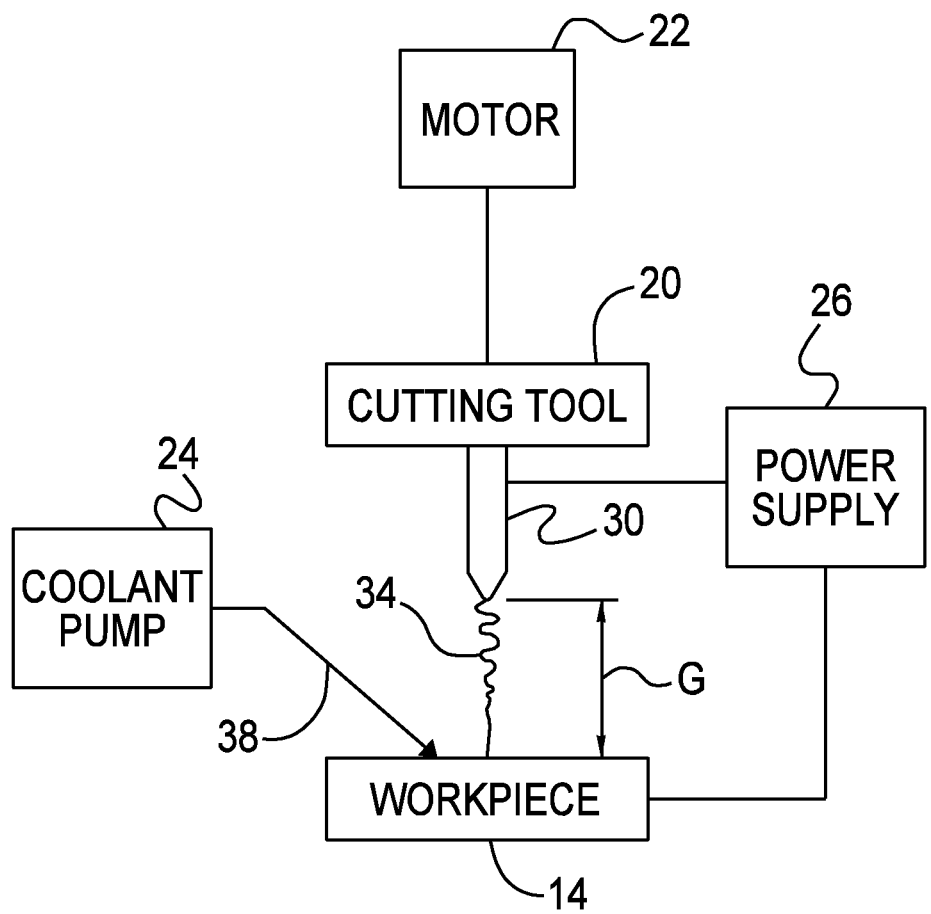
FIG. 3 is a schematic representation of a cutting tool operating on a workpiece for the system of FIG. 1.

Referring now to FIG. 3, the cutting tool 20 comprises an electrode 30. The electrode 30 is connected to one terminal of the power source 26 (which is a source of direct current), and the workpiece 14 is connected to another terminal of the power source. The tip of the electrode 30 is spaced from the workpiece 14 such that a gap G is defined. Upon the application of power from the power source 26, an electrical discharge in the form of an arc 34 passes from the tip of the electrode 30 across the gap G to the workpiece 14. A voltage produced by the arc 34 melts and vaporizes a small area of the surface of the workpiece 14.

The melted and vaporized material is the swarf, which is formed by small bits of molten metal and vaporized metal that are cooled and re-solidified by dielectric fluid 38 (supplied by the dielectric fluid pump 24) to form the particles. Continued application of the dielectric fluid 38 flushes the swarf from the workpiece 14 to allow the electrode 30 to continue cutting the workpiece unimpeded.

Figure 4:
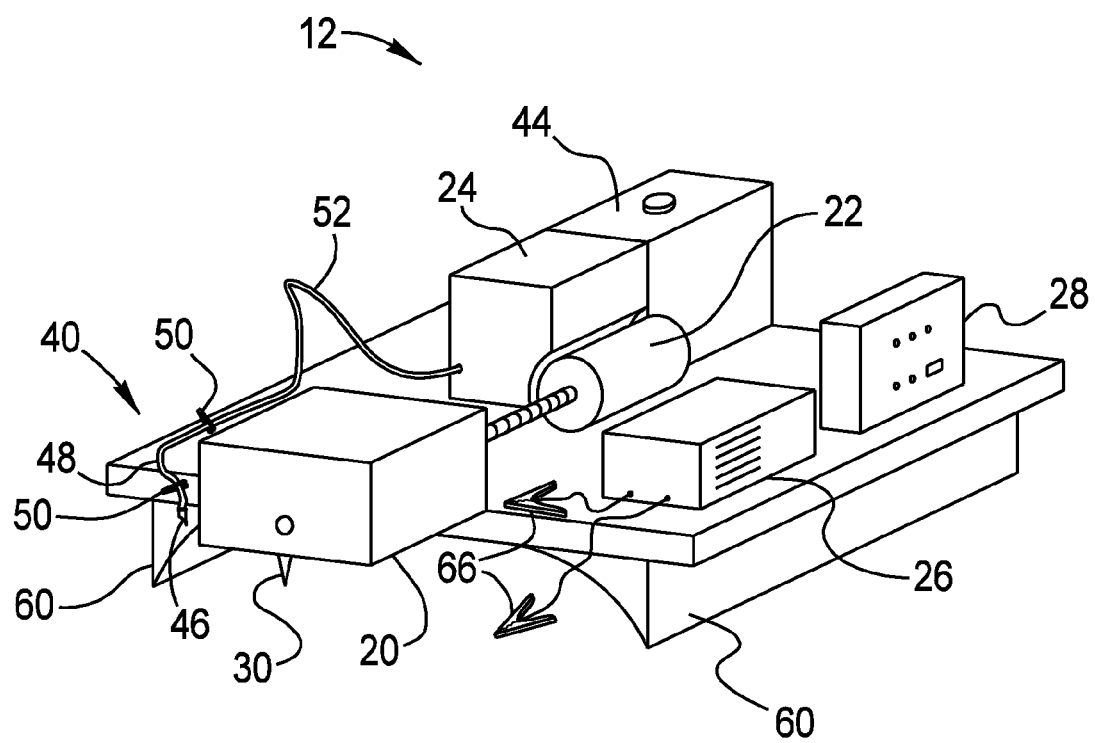
FIG. 4 is a perspective schematic representation of the portable EDM device.

Referring now to FIG. 4, a device embodied by the portable EDM system 12 is mounted on a base 40, the base being sized to accommodate the cutting tool 20, the dielectric fluid pump 24, the power source 26, as well as any ancillary elements used in the operation of the portable EDM system. One such ancillary element accommodated on the base 40 is a dielectric fluid reservoir 44, which is in fluid communication with the dielectric fluid pump 24 and from which the dielectric fluid 38 is supplied to the workpiece through a nozzle 46.

To make the nozzle 46 movable with the movement of the cutting tool 20 and the electrode 30, a flexible hose 48 (or other suitable conduit) on which the nozzle is mounted is connected to the cutting tool 20 using clips 50 or any other suitable means such that a loop 52 of the flexible hose is formed between a point at which the flexible hose is attached to the cutting tool and dielectric fluid pump 24. Accordingly, when the motor 22 drives the cutting tool 20, the loop 52 can become smaller or larger as needed to accommodate movement of the cutting tool.

Terminals of the power source 26 are connectable to the electrode 30 and the workpiece 14 using any suitable means such as clamps 66. The connection of the power source 26 to the electrode 30 and the workpiece 14 is not limited to the use of clamps 66, however, as any other means of connection may be employed. Particularly with regard to the connection of the power source 26 to the electrode 30, the connection may be hard-wired.

Supports 60 are located on the base 40 to allow the base to be mounted on a length of pipe (workpiece 14). The supports 60 may be legs, braces, or any suitably configured structure. Surfaces of the supports 60 may be arcuate to accommodate the outer surfaces of the workpiece 14 when the workpiece is a pipe. Adjustable shims or the like may be incorporated into such arcuate surfaces to accommodate pipes of different diameters or having other outer configurations. Wheels may be attached to the base 40 to facilitate transportation of the device of the portable EDM system 12, the wheels being retractable or removable so as to avoid interference with the operation of the device when mounted on the workpiece 14. The wheels may also facilitate the movement of the device into a vehicle for transport and movement of the device around a job site at which notching and/or testing is carried out.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above description, but that the invention will include all embodiments falling within the scope of the appended claims.

What is claimed is:

1. A portable EDM system for producing calibration reflectors on a pipe, the system comprising:
   a base mountable on the pipe;
   a cutting tool;
   a motor operably connected to the cutting tool for moving the cutting tool in a preselected pattern;
   an electrode operably connected to the cutting tool;
   a power source operably connected to the electrode and operably connectable to the pipe, the power source being configured to electrically discharge a voltage from the electrode to the pipe to remove material from the pipe; and
   a source of dielectric fluid in fluid communication with the pipe to remove the material removed from the pipe;
   wherein one or more of the motor, the power source, and the source of dielectric fluid is mounted on the base.

2. The portable EDM system of claim 1, further comprising a controller in communication with the motor, the source of dielectric fluid, and the power source.

3. The portable EDM system of claim 1, wherein the source of dielectric fluid comprises,
   a dielectric fluid reservoir containing a dielectric fluid,
   a dielectric fluid pump through which the dielectric fluid can be pumped,
   a conduit through which the dielectric fluid can be transferred from the dielectric fluid pump, and
   a nozzle through which the dielectric fluid can be dispensed to the pipe.

4. The portable EDM system of claim 1, further comprising a support on a surface of the base, the support being sized and configured to mount the portable EDM system onto the pipe.

5. A portable EDM device for producing calibration reflectors on a pipe, the portable EDM device comprising:
   a base mountable on the pipe;
   a motor mounted on the base;

a cutting tool operably connected to the motor;
an electrode operably connected to the cutting tool;
a power source mounted on the base and operably connected to the electrode and operably connectable to the pipe, the power source being configured to electrically discharge a voltage from the electrode to the pipe to remove material from the pipe; and
a source of dielectric fluid mounted on the base and in fluid communication with the pipe to remove the material removed from the pipe.

6. The portable EDM device of claim 5, wherein the source of dielectric fluid comprises,
a dielectric fluid reservoir containing a dielectric fluid,
a dielectric fluid pump through which the dielectric fluid can be pumped,
a conduit through which the dielectric fluid can be transferred from the dielectric fluid pump, and
a nozzle through which the dielectric fluid can be dispensed to the pipe.

7. The portable EDM device of claim 5, further comprising a controller mounted on the base and in communication with the motor, the power source, and the source of dielectric fluid, the controller being configured to provide control signals to control the discharge of the voltage from the electrode, to control an operation of the motor, and to control a flow of dielectric fluid from the source of dielectric fluid.

8. The portable EDM device of claim 5, further comprising a support located on the base, the support being configured to accommodate on outer surface of the pipe on which the portable EDM device is mounted.

* * * * *